(12) United States Patent
Huang-Fu et al.

(10) Patent No.: US 11,006,478 B2
(45) Date of Patent: May 11, 2021

(54) ENHANCED PROCEDURE TRANSACTION ID HANDLING

(71) Applicant: MEDIATEK INC., Hsin-Chu (TW)

(72) Inventors: Chien-Chun Huang-Fu, Hsin-Chu (TW); Yu-Chieh Tien, Hsin-Chu (TW); Chi-Hsien Chen, Hsin-Chu (TW); Shang-Ru Mo, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 6 days.

(21) Appl. No.: 16/453,085

(22) Filed: Jun. 26, 2019

(65) Prior Publication Data

US 2020/0008268 A1   Jan. 2, 2020

Related U.S. Application Data

(60) Provisional application No. 62/690,807, filed on Jun. 27, 2018.

(51) Int. Cl.
*H04W 80/10* (2009.01)
*H04W 76/11* (2018.01)
(Continued)

(52) U.S. Cl.
CPC ............ *H04W 80/10* (2013.01); *H04W 76/11* (2018.02); *H04W 76/18* (2018.02); *H04W 76/25* (2018.02); *H04W 76/30* (2018.02)

(58) Field of Classification Search
CPC ..... H04W 80/10; H04W 76/11; H04W 76/25; H04W 76/30; H04W 76/18; H04W 76/20
See application file for complete search history.

(56) References Cited

U.S. PATENT DOCUMENTS

| 2015/0256453 | A1 | 9/2015 | Laraqui et al. ............... 370/392 |
| 2017/0265182 | A1 | 9/2017 | Guo et al. |
| 2018/0220478 | A1 | 8/2018 | Zhu et al. |

FOREIGN PATENT DOCUMENTS

| CN | 105981470 A | 2/2014 |
| CN | 107925904 A | 7/2015 |

(Continued)

OTHER PUBLICATIONS

TS 24.501 v15.0.0, Jun. 15, 2018, 3GPP.*

(Continued)

*Primary Examiner* — Jae Y Lee
(74) *Attorney, Agent, or Firm* — Imperium Patent Works; Zheng Jin

(57) ABSTRACT

A method for Procedure Transaction Identity (PTI) exception handling on protocol data unit (PDU) session modification and establishment procedure is proposed. If a UE receives a PDU SESSION MODIFICATION COMMAND message in which the PTI value is an assigned value that does not match any PTI in use, the UE stays in the current 5GSM state and sends a 5GSM STATUS message including 5GSM cause #47 "PTI mismatch", and the network will send another COMMAND message with the correct PTI value. If the UE receives a PDU SESSION ESTABLISHMENT ACCEPT or REJECT message in which the PTI value is an assigned value that does not match any PTI in use, the UE responds with a 5GSM STATUS message including 5GSM cause #47 "PTI mismatch", and the network will send another ACCEPT or REJECT message with the correct PTI value.

16 Claims, 4 Drawing Sheets

(51) Int. Cl.
    *H04W 76/25*     (2018.01)
    *H04W 76/30*     (2018.01)
    *H04W 76/18*     (2018.01)

(56) References Cited

FOREIGN PATENT DOCUMENTS

| | | |
|---|---|---|
| TW | 201733384 A | 3/2016 |
| WO | WO2018082760 A1 | 11/2016 |

OTHER PUBLICATIONS

International Search Report and Written Opinion of International Search Authority for PCT/CN2019/093197 dated Sep. 26, 2019 (9 pages).
Taiwan IPO, office action for related TW patent application 108122564 (no English translation is available) dated May 15, 2020 (7 pages).
3GPP TS 24.501 V15.0.0 (Jun. 2018), 3rd Generation Partnership Project; Technical Specification Group Core Network and Terminals; Non-Access-Stratum (NAS) protocol for 5G System (5GS); Stage 3 (Release 15) *pp. 150, 171-173, 203*.

* cited by examiner

ENHANCED PROCEDURE TRANSACTION ID HANDLING

CROSS REFERENCE TO RELATED APPLICATIONS

This application claims priority under 35 U.S.C. § 119 from U.S. Provisional Application No. 62/690,807, entitled "Enhanced Handling on 5G Session Management", filed on Jun. 27, 2018, the subject matter of which is incorporated herein by reference.

TECHNICAL FIELD

The disclosed embodiments relate generally to wireless communication, and, more particularly, to method of supporting enhanced procedure transaction ID (PTI) handling in next generation 5G mobile communication systems.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. With the optimization of the network design, many improvements have developed over the evolution of various standards. The Next Generation Mobile Network (NGMN) board, has decided to focus the future NGMN activities on defining the end-to-end requirements for 5G new radio (NR) systems.

In 5G/NR, a Protocol Data Unit (PDU) session defines the association between the UE and the data network that provides a PDU connectivity service. Each PDU session is identified by a PDU session ID (PSI), and may include multiple QoS flows and QoS rules. The PDU session establishment is a parallel procedure of PDN connection (bearer) procedure in 4G/LTE. In 4G/LTE, a Procedure Transaction Identity (PTI) is an identity that is allocated by the UE for UE-requested bearer resource activation, modification, and deactivation procedures. Similarly, PTI is also used as an identity that is allocated by the UE for the UE-requested PDU session establishment, modification, and release procedure in 5G/NR.

In case the UE receives a PDU SESSION MODIFICATION COMMAND message in which the PTI value is an assigned value that does not match any PTI in use, the UE behavior is undefined. For example, the UE can respond to the network with a PDU SESSION MODIFICATION COMMAND REJECT message. However, it is not defined whether the network will resend the command message, or whether the UE shall stay in the current 5GSM state? Or back to active state? As a result, it creates a lot of issues by responding with the PDU SESSION MODIFICATION COMMAND REJECT message. The same issues will also happen in the PDU SESSION ESTABLISHMENT procedure and in 4G LTE systems.

A solution is sought.

SUMMARY

A method for Procedure Transaction Identity (PTI) exception handling on protocol data unit (PDU) session modification and establishment procedure is proposed. If a UE receives a PDU SESSION MODIFICATION COMMAND message in which the PTI value is an assigned value that does not match any PTI in use, the UE stays in the current 5GSM state and sends a 5GSM STATUS message including 5GSM cause #47 "PTI mismatch", and the network will send another COMMAND message with the correct PTI value. If the UE receives a PDU SESSION ESTABLISHMENT ACCEPT or REJECT message in which the PTI value is an assigned value that does not match any PTI in use, the UE responds with a 5GSM STATUS message including 5GSM cause #47 "PTI mismatch", and the network will send another ACCEPT or REJECT message with the correct PTI value.

In one embodiment, a UE allocates a procedure transmission identity (PTI) value in a mobile communication network. The PTI value identifies a corresponding 5G session management (5GSM) procedure related to a Protocol Data Unit (PDU) session. The UE sends a 5GSM request to the network with the allocated PTI value. The UE receives a network response that is associated with the PDU session. The network response contains a UE-received PTI value. The UE determines whether the UE-received PTI value matches any in-use PTI value of the PDU session. The UE transmits a 5GSM status message to the network in response to a determined PTI mismatch. The 5GSM status message contains a cause value #47 that indicates the determined PTI mismatch. UE maintains the current 5GSM state. In one example, the network response is a PDU SESSION MODIFICATION COMMAND message. In another example, the network response is a PDU SESSION ESTABLISHMENT ACCEPT or REJECT message.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
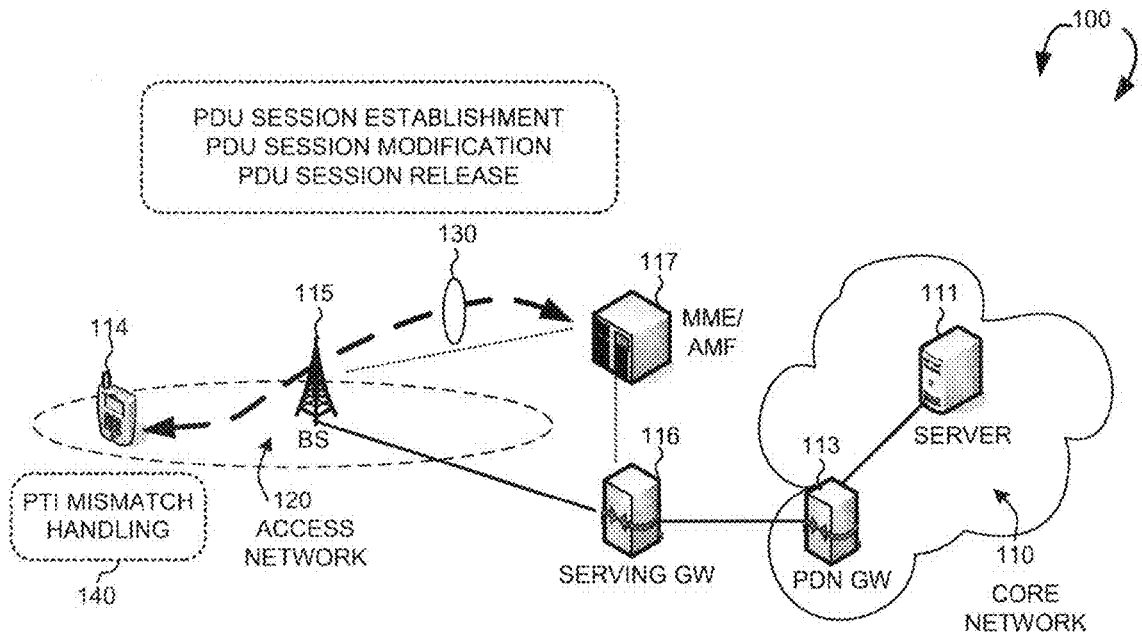
FIG. 1 illustrates an exemplary 5G new radio (NR) network supporting enhanced procedure transaction identity (PTI) handling in accordance with one novel aspect.

FIG. 1 illustrates an exemplary 4G LTE or 5G new radio (NR) network 100 supporting enhanced procedure transaction identity (PTI) handling in accordance with one novel aspect. LTE/NR network 100 comprises application server 111 that provides various services by communicating with a plurality of user equipments (UEs) including UE 114. In the example of FIG. 1, application server 111 and a packet data network gateway (PDN GW or P-GW) 113 belong to part of a core network CN 110. UE 114 and its serving base station BS 115 belong to part of a radio access network RAN 120. RAN 120 provides radio access for UE 114 via a radio access technology (RAT). Application server 111 communicates with UE 114 through PDN GW 113, serving GW 116, and BS 115. A mobility management entity (MME) or an access and mobility management function (AMF) 117 communicates with BS 115, serving GW 116 and PDN GW 113 for access and mobility management of wireless access devices in LTE/NR network 100. UE 114 may be equipped with a radio frequency (RF) transceiver or multiple RF transceivers for different application services via different RATs/CNs. UE 114 may be a smart phone, a wearable device, an Internet of Things (IoT) device, and a tablet, etc.

In 5G/NR, a Protocol Data Unit (PDU) session defines the association between the UE and the data network that provides a PDU connectivity service. Each PDU session is identified by a PDU session ID (PSI), and may include multiple QoS flows and QoS rules. A procedure transaction Identity (PTI) is used as an identity that is allocated by the UE for the UE-requested PDU session establishment, modification, and release procedures (130). In case the UE receives a PDU SESSION MODIFICATION COMMAND message in which the PTI value is an assigned value that does not match any PTI in use, the UE behavior is undefined. For example, the UE can respond to the network with a PDU SESSION MODIFICATION COMMAND REJECT message. However, it is not defined whether the network will resend the command message, or whether the UE shall stay in the current 5GSM state. As a result, it creates a lot of issues by responding with the PDU SESSION MODIFICATION COMMAND REJECT message. The same issues will also happen in the PDU SESSION ESTABLISHMENT procedure. In case the UE receives a PDU SESSION ESTABLISHMENT ACCEPT message in which the PTI value is an assigned value that does not match any PTI in use, the UE behavior is undefined. UE does not know what to do and whether it shall stay in the current 5GSM state or go to another 5GSM state.

In accordance with one novel aspect, the PTI exception handling on PDU session modification and establishment procedure is depicted by 140. In case the UE receives a PDU SESSION MODIFICATION COMMAND message in which the PTI value is an assigned value that does not match any PTI in use, the UE stays in 5GSM modification pending state for the PDU session. UE responds with a 5GSM STATUS message including 5GSM cause #47 "PTI mismatch", so that the network will send another COMMAND message with the correct PTI value. The timer for PDU session modification request can be kept running, or be reset or restarted. In case the UE receives a PDU SESSION ESTABLISHMENT ACCEPT or REJECT message in which the PTI value is an assigned value that does not match any PTI in use, UE responds with a 5GSM STATUS message including 5GSM cause #47 "PTI mismatch", so that the network will send another ACCEPT or REJECT message with the correct PTI value.

Figure 2:
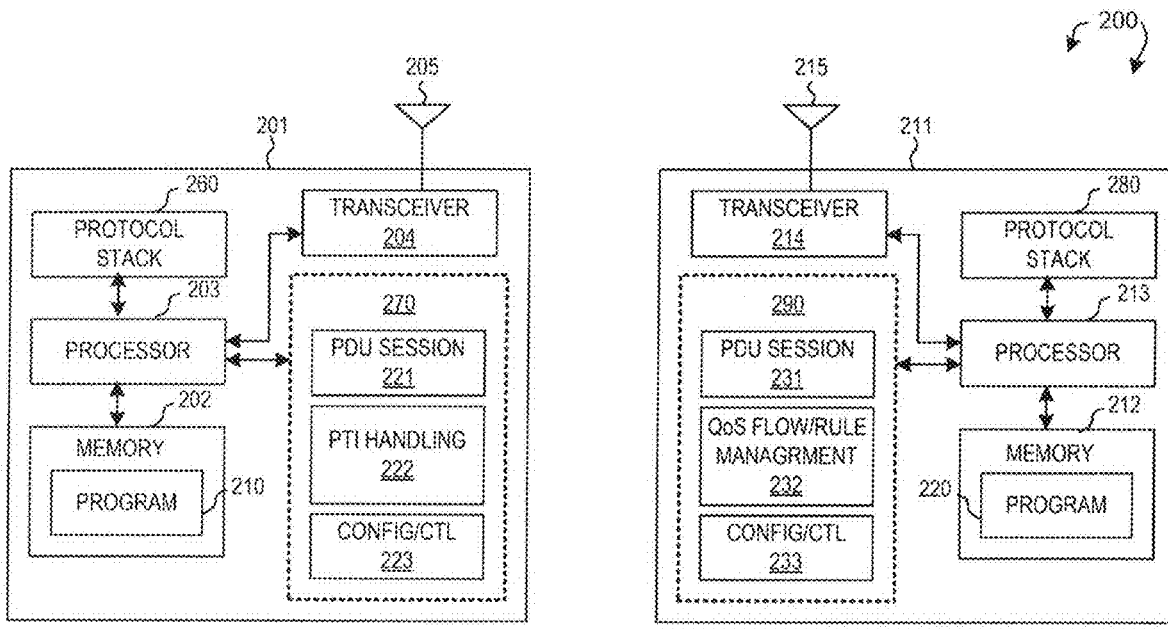
FIG. 2 illustrates simplified block diagrams of a user equipment (UE) in accordance with embodiments of the current invention.

FIG. 2 illustrates simplified block diagrams of wireless devices, e.g., a UE 201 and network entity 211 in accordance with embodiments of the current invention. Network entity 211 may be a base station combined with an MME or AMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes a set of control functional modules and circuit 290. PDU session handling circuit 231 handles PDU session establishment and modification procedures. QoS flow and rule management circuit 232 creates, modifies, and deletes QoS flows and QoS rules for UE. Configuration and control circuit 233 provides different parameters to configure and control UE.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also comprises a set of functional modules and control circuits to carry out functional tasks of UE 201. Protocol stacks 260 comprise Non-Access-Stratum (NAS) layer to communicate with an MME or an AMF entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network. In one example, system modules and circuits 270 comprise PDU session handling circuit 221 that performs PDU session establishment and modification procedures with the network, a PTI handling circuit 222 that maintains a PTI table in UE memory 202, allocates and releases PTI for corresponding procedure, and handles PTI mismatch accordingly, and a config and control circuit 223 that handles configuration and control parameters from the network.

Figure 3:
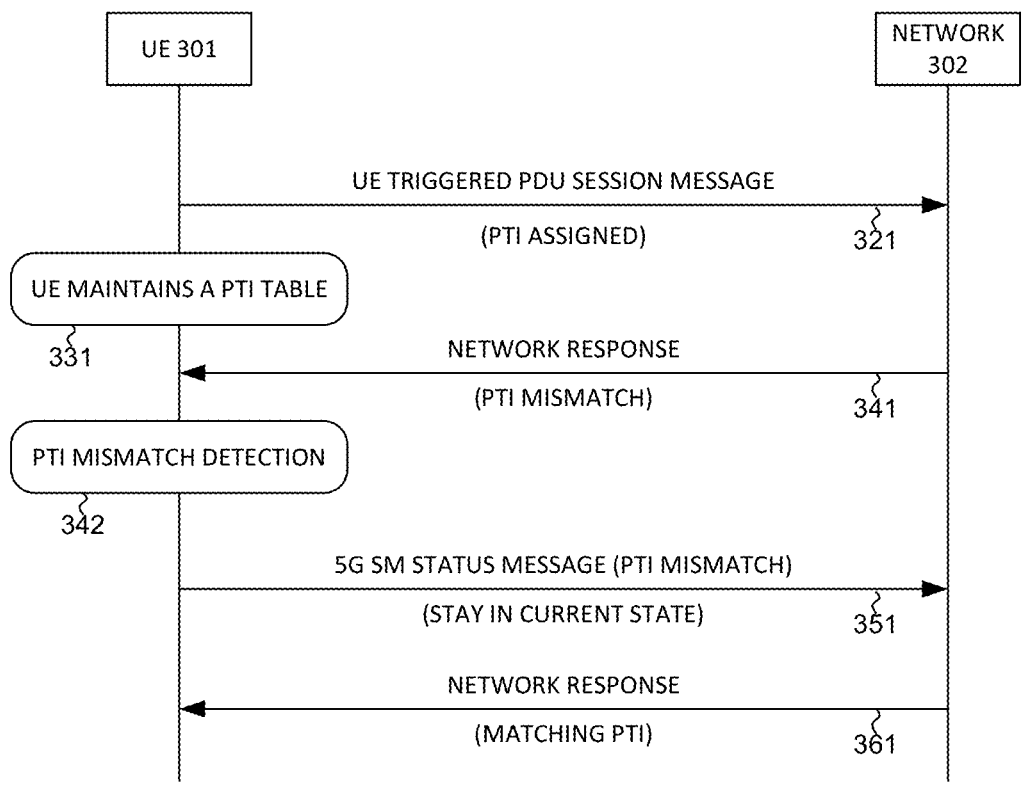
FIG. 3 illustrates a sequence flow of PTI handling for PDU session establishment and modification procedure in accordance with embodiments of the current invention.

FIG. 3 illustrates a sequence flow of PTI handling for PDU session establishment and modification procedure in accordance with embodiments of the current invention. PTI is an identity that is dynamically allocated by the UE for the UE requested 5G session management (5GSM) procedures. On the other hand, for network requested 5GSM procedures, PTI value is unassigned. UE maintains a PTI table of the allocated PTIs for each PDU session, and releases a PTI at a proper time after the corresponding 5GSM procedure is completed. Note that the UE cannot release the PTI value immediately in case the network may re-transmit the same message to the UE. For example, if the PDU SESSION MODIFICATION COMMAND message contains the PTI value allocated in the UE-requested PDU session modification procedure, the UE should stop the timer T3581. The UE should ensure that the PTI value assigned to this procedure is not released immediately. The way to achieve this is implementation dependent. For example, the UE can ensure that the PTI value assigned to this procedure is not released during the time equal to or greater than the default value of timer T3591.

In step 312, UE 301 triggers an 5GSM procedure for a PDU session by sending an 5GSM message to network 302, the 5GSM message has an assigned PTI value determined by UE 301. UE 301 also maintains an in-use PTI table, containing all in-use PTI values for each PDU session. In step 341, UE 301 receives a network response message for the PDU session. The network response message carries a PTI value. However, UE 301 cannot find any matching in-use PTIs for the PTI value from the in-use PTI table, UE 301 thus detects a PTI mismatch (step 342). Note that when UE 301 receives the network response in step 341, it is possible that UE did not send any 5GSM message with PTI, i.e., the PTI table may be empty (step 321 and step 331 have not happened). Under such scenario, UE 301 also cannot find any matching in-use PTIs for the PTI value since the PTI table is empty. In step 351, UE 301 sends a 5GSM status message to network 302, the 5GSM status message carries a cause value #47 indicating "PTI mismatch" for the previous network response message. UE 301 also maintains its current 5GSM state. In step 361, in response to the 5GSM status message, network 320 retransmits another network response message to UE 301, and the retransmitted response message has a matching PTI value.

Note that when UE 301 receives a network response having PTI mismatch problem (step 341), the network and UE behavior in the current art is undefined. Specifically, for each PDU session, a UE can be in many different 5GSM states at different stages of the PDU establishment and modification procedure. Therefore, when UE encounters the PTI mismatch problem, it is possible for UE to either stay in its current 5GSM state or go to another 5GSM state. However, since the network behavior is also undefined, the network may or may not resend the network response having the correct matching PTI value. As a result, the PDU session procedure may not be able to recover from the PTI mismatch problem. In one advantageous aspect, upon UE 301 receives a network response and detects PTI mismatching issue (step 342), UE 301 remains in its current 5GSM state, and sends a 5GSM status message to the network (step 351). In response, network 302 will always resend the network response with the correct PTI value and resolve the PTI mismatch issue (step 361).

Figure 4:
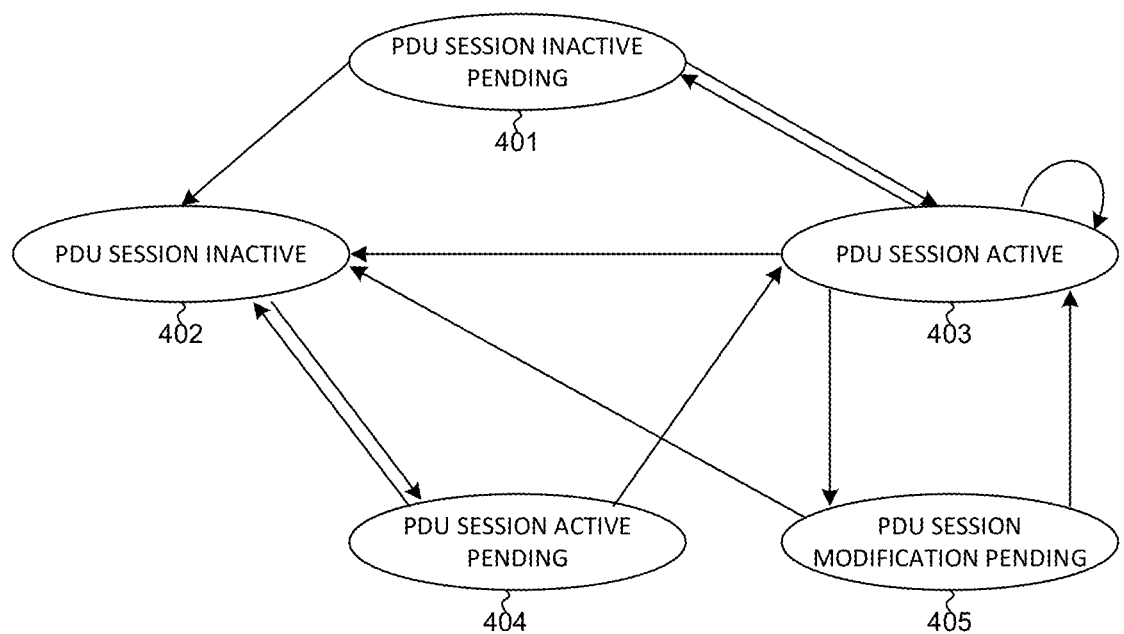
FIG. 4 illustrates a simplified state machine with different UE states for PDU session establishment and modification procedures a in accordance with embodiments of the current invention.

FIG. 4 illustrates a simplified state machine with different UE states for PDU session establishment and modification procedures in accordance with embodiments of the current invention. For each PDU session, a UE can be in many different 5GSM states at different stages of the PDU establishment and modification procedure. From PDU session inactive pending state (401), UE can go to PDU session inactive state (402) if UE receives a PDU SESSION RELEASE COMMAND message, UE can also go to PDU session active state (403) if UE receives a PDU SESSION RELEASE REJECT message. From PDU session inactive state (402), UE can go to PDU session active pending state (404) when UE sends out a PDU SESSION ESTABLISHMENT REQUEST message. From PDU session active pending state (404), UE can go to PDU session inactive if UE receives a PDU SESSION ESTABLISHMENT REJECT message, UE can also go to PDU session active state (403) if UE receives PDU SESSION ESTABLISHMENT ACCEPT message. From PDU session active state (403), UE can possibly go to other three states or remain in active state. For example, UE can go to PDU session modification pending state (405) when UE sends out a PDU SESSION MODIFICATION REQUEST message. From PDU session modification pending state (405), UE can go to PDU session inactive state (402) if UE receives a PDU SESSION MODIFICATION REJECT message, UE can go to PDU session active state (403) if UE receives a PDU SESSION MODIFICATION COMMAND message or a PDU SESSION MODIFICATION REJECT message.

Note that this state machine does not illustrates all possible UE states and associated state transactions for the PDU session and procedures. However, the state machine defines some of the UE behaviors when UE is in certain states and receives or sends certain 5GSM messages. For example, if UE is in PDU session modification pending state (405), and UE receives a PDU SESSION MODIFICATION COMMAND message with a mismatching PTI value, UE can respond to the network with a PDU SESSION MODIFICATION COMMAND REJECT message, and either go to active state or remains in its current state. If UE goes to active state, then it would be a problem if the network resends the command message with a matching PTI value. If UE remains in the current state, then it would be a problem if the network does not resend the command message. In another example, if UE is in PDU session active pending state (404), and UE receives a PDU SESSION ESTABLISHMENT ACCEPT message with a mismatching PTI value, UE does know whether it should go to inactive state or remains in active pending state. In one advantageous aspect, upon UE receives a network response that has PTI mismatching issue, UE remains in its current 5GSM state, and sends a 5GSM status message to the network. In response, the network will resend the network response with the correct PTI value and resolve the PTI mismatch issue.

Figure 5:
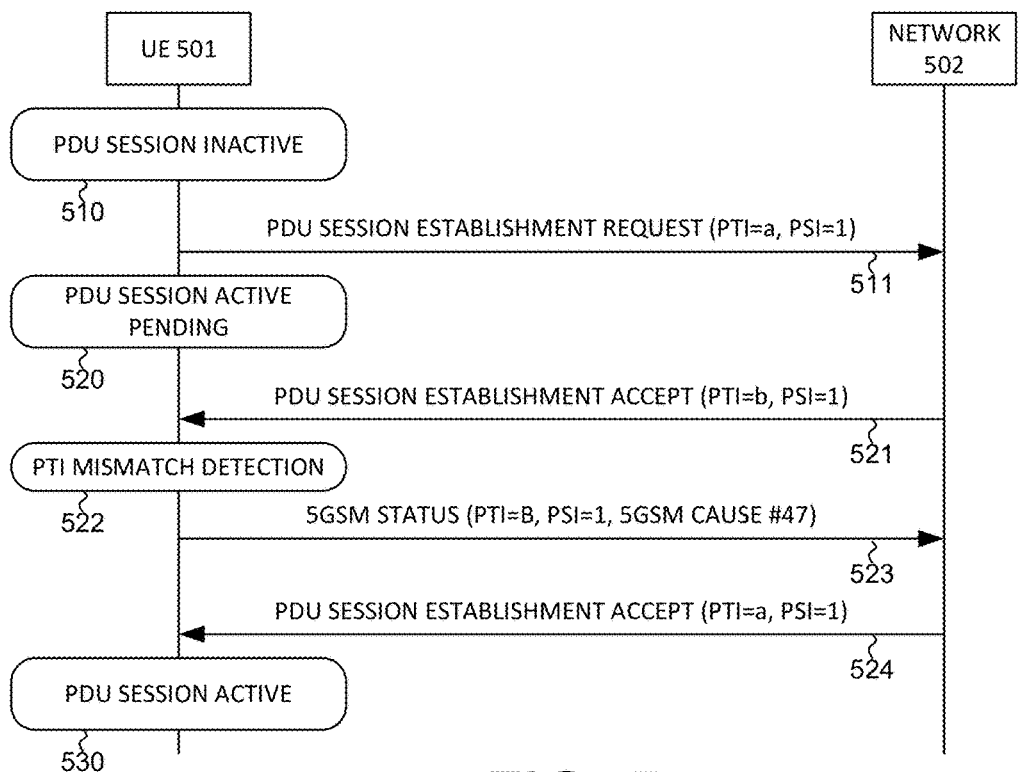
FIG. 5 illustrates a first embodiment of PTI handling during a PDU session establishment procedure in accordance with one novel aspect.

FIG. 5 illustrates a first embodiment of PTI handling during a PDU session establishment procedure in accordance with one novel aspect. In step 510, UE 501 is in PDU session inactive state. In step 511, UE 501 sends a PDU session establishment request message to network 502. UE 501 allocates PTI=a for the PDU session with PSI=1. Therefore, the request message carries PTI=a and PSI=1. In step 520, UE 501 goes to PDU session active pending state. In step 521, UE 501 receives a PDU session establishment accept message from network 502. However, the accept message carries PTI=b and PSI=1. Upon receiving the accept message, in step 522, UE 501 cannot find PTI=b in its PTI table for PDU session with PSI=1 and thus detects a PTI mismatch. In step 523, UE 501 sends a 5GSM status message to network 502 and UE 501 remains in its current 5GSM state of PDU session active pending. The 5GSM status message carries a cause value of #47 to indicate the PTI mismatch. In step 524, in response to the status message, network 502 sends another PDU session establishment accept message, with PTI=a and PSI=1. In step 530, upon receiving the accept message having the correct PTI value, UE 501 goes to PDU session active state.

Figure 6:
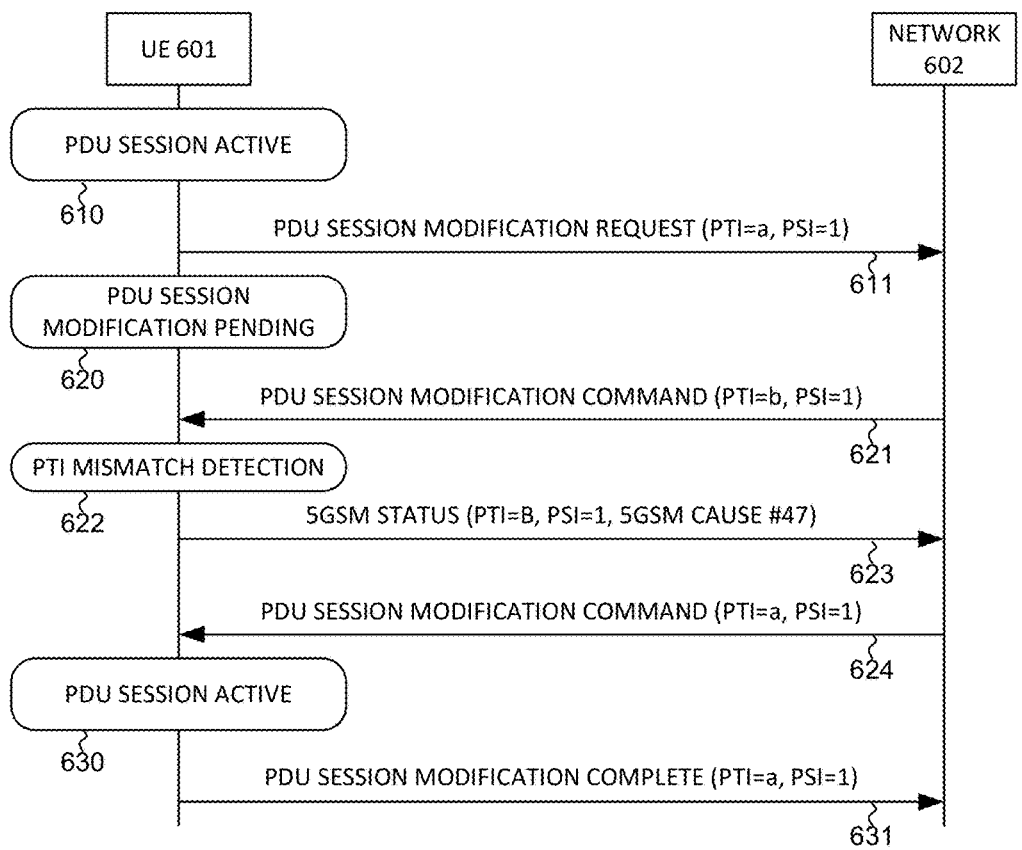
FIG. 6 illustrates a second embodiment of PTI handling during a PDU session modification procedure in accordance with one novel aspect.

FIG. 6 illustrates a second embodiment of PTI handling during a PDU session modification procedure in accordance with one novel aspect. In step 610, UE 601 is in PDU session active state. In step 611, UE 601 sends a PDU session modification request message to network 602. UE 601 allocates PTI=a for the PDU session with PSI=1. Therefore, the request message carries PTI=a and PSI=1. In step 620, UE 501 goes to PDU session modification pending state. In step 621, UE 601 receives a PDU session modification command message from network 602. However, the command message carries PTI=b and PSI=1. Upon receiving the command message, in step 622, UE 601 cannot find PTI=b in its PTI table for PDU session with PSI=1 and thus detects a PTI mismatch. In step 623, UE 601 sends a 5GSM status message to network 602 and UE 601 remains in its current 5GSM state of PDU session modification pending. The 5GSM status message carries a cause value of #47 to indicate the PTI mismatch. In step 624, in response to the status message, network 602 sends another PDU session modification command message, with PTI=a and PSI=1. In step 630, upon receiving the command message having the correct PTI value, UE 601 goes to PDU session active state. In step 631, UE 601 sends a PDU session modification complete message with PTI=a and PSI=1 to network 602 to complete the modification procedure.

Figure 7:
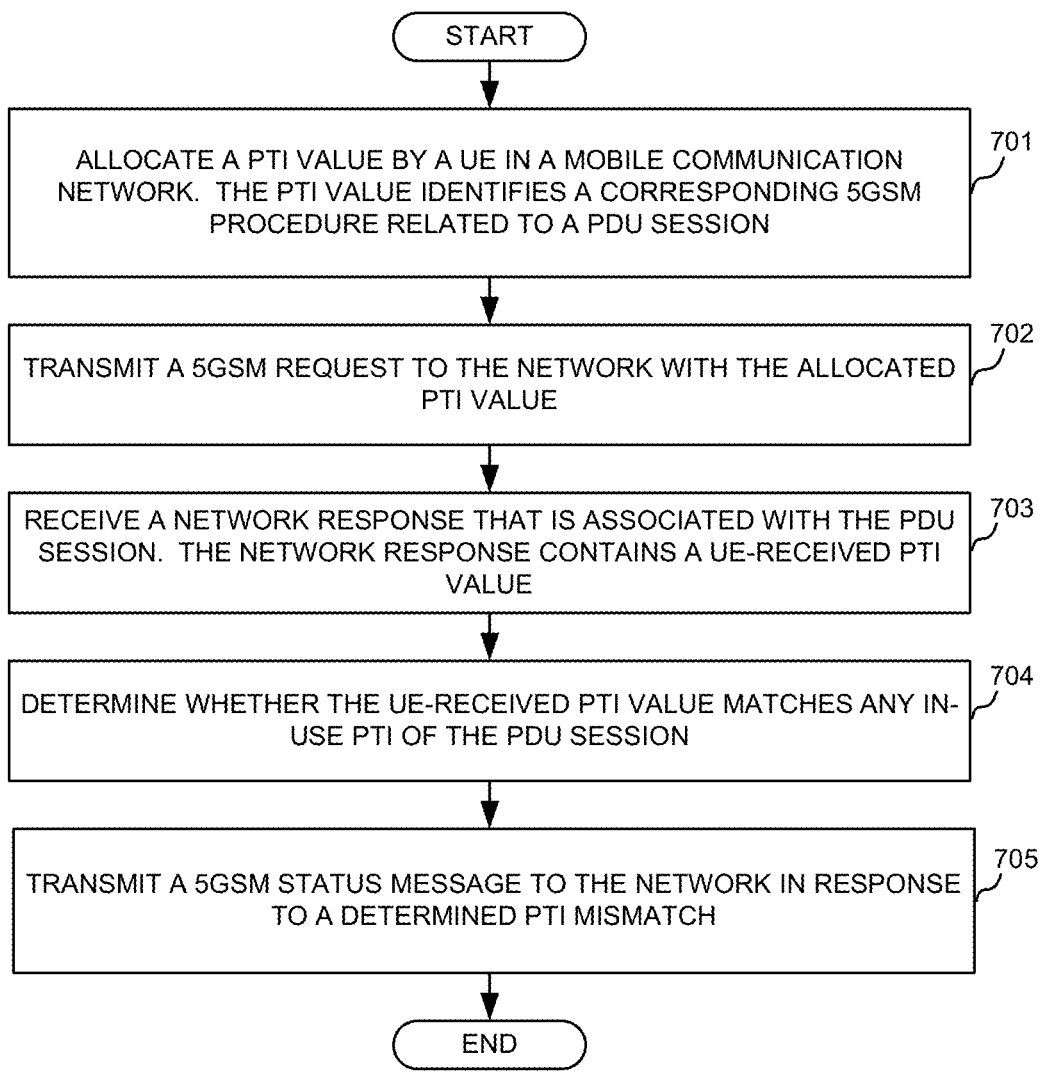
FIG. 7 is a flow chart of a method of supporting enhanced PTI handling for 5G NR networks in accordance with one novel aspect.

FIG. 7 is a flow chart of a method of supporting enhanced PTI handling for 5G NR networks in accordance with one novel aspect. In step 701, a UE allocates a procedure transmission identity (PTI) value in a mobile communication network. The PTI value identifies a corresponding 5G session management (5GSM) procedure related to a Protocol Data Unit (PDU) session. In step 702, the UE sends a 5GSM request to the network with the allocated PTI value. In step 703, the UE receives a network response that is associated with the PDU session. The network response contains a UE-received PTI value. In step 704, the UE determines whether the UE-received PTI value matches any in-used PTI values of the PDU session. In step 705, the UE transmits a 5G session management (5GSM) status message to the network in response to a determined PTI mismatch. The 5GSM status message contains a cause value #47 that indicates the determined PTI mismatch. UE maintains the current 5GSM state. In one example, the network response is a PDU SESSION MODIFICATION COMMAND message. In another example, the network response is a PDU SESSION ESTABLISHMENT ACCEPT or REJECT message.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
receiving a network response by a user equipment (UE) in a mobile communication network, wherein the network response is associated with a Protocol Data Unit (PDU) session and contains a procedure transaction identity (PTI) value, and wherein the network response is a PDU SESSION MODIFICATION COMMAND message;
determining whether the PTI value matches any in-use PTI values associated with the PDU session maintained by the UE; and
transmitting a 5G session management (5GSM) status message to the network in response to a determined PTI mismatch, wherein the UE remains in a current 5GSM state upon transmitting the 5GSM status message.

2. The method of claim 1, wherein the 5GSM status message contains a cause value #47 that indicates the determined PTI mismatch.

3. The method of claim 1, wherein the UE does not respond with a PDU SESSION MODIFICATION COMMAND REJECT message.

4. The method of claim 3, wherein the UE remains in PDU session modification pending state upon transmitting the 5GSM status message.

5. The method of claim 1, wherein the UE receives another PDU SESSION MODIFICATION COMMAND message with a matching PTI value.

6. A method, comprising:
receiving a network response by a user equipment (UE) in a mobile communication network, wherein the network response is associated with a Protocol Data Unit (PDU) session and contains a procedure transaction identity (PTI) value, wherein the network response is a PDU SESSION ESTABLISHMENT ACCEPT or REJECT message;
determining whether the PTI value matches any in-use PTI values associated with the PDU session maintained by the UE; and
transmitting a 5G session management (5GSM) status message to the network in response to a determined PTI mismatch.

7. The method of claim 6, wherein the UE remains in PDU session active pending state upon transmitting the 5GSM status message.

8. The method of claim 7, wherein the UE receives another PDU SESSION ESTABLISHMENT ACCEPT or REJECT message with a matching PTI value.

9. The method of claim 1, further comprising:
allocating and maintaining a unique PTI value to a UE-triggered 5G session management (5GSM) procedure of the PDU session; and
sending a 5GSM request to the network with the allocated unique PTI value.

10. The method of claim 9, wherein the UE releases the unique PTI value at a time after the UE-triggered 5GSM procedure is completed.

11. A User Equipment (UE), comprising:
a receiver that receives a network response that is associated with a Protocol Data Unit (PDU) session, wherein the network response contains a procedure transaction identity (PTI) value, wherein the network response is a PDU SESSION ESTABLISHMENT ACCEPT or REJECT message;
a PTI handling circuit determines whether the PTI value matches any in-use PTI values associated with the PDU session maintained by the UE; and a transmitter that transmits a 5G session management (5GSM) status message to the network in response to a determined PTI mismatch.

12. The UE of claim 11, wherein the 5GSM status message contains a cause value #47 that indicates the determined PTI mismatch.

13. The UE of claim 11, wherein the UE remains in PDU session active pending state upon transmitting the 5GSM message.

14. The UE of claim 13, wherein the UE receives another PDU SESSION ESTABLISHMENT ACCEPT or REJECT message with a matching PTI value.

15. The UE of claim 11, wherein the UE allocates and maintains a unique PTI value to a UE-triggered 5G session management (5GSM) procedure of the PDU session, and sends a 5GSM request to the network with the allocated unique PTI value.

16. The UE of claim 15, wherein the UE releases the unique PTI value at a time after the UE-triggered session management procedure is completed.

* * * * *